United States Patent Office 3,644,311
Patented Feb. 22, 1972

3,644,311
REDUCTION OF POLYMER BUILD-UP IN ETHYLENE COPOLYMERIZATION
Bart A. Diliddo, Seven Hills, and Bernard F. Cinadr, Brecksville, Ohio, assignors to The B. F. Goodrich Company, New York, N.Y.
No Drawing. Continuation-in-part of application Ser. No. 772,373, Oct. 31, 1968. This application Nov. 3, 1969, Ser. No. 873,490
Int. Cl. C08f 15/04
U.S. Cl. 260—80.78                          6 Claims

ABSTRACT OF THE DISCLOSURE

In the suspension polymerization of ethylene, propylene and a polyene in the absence of substantial amounts of extraneous diluents, particularly in a continuous system, where polymer build-up interferes with the polymerization reaction and causes mechanical problems, the amount of polymer build-up is reduced by including in the polymerization system an aliphatic hydrocarbon solubilizing agent containing 6 to 10 carbon atoms which comprises from 5 to about 75% of the total of propylene and aliphatic hydrocarbons present in the reaction mixture.

CROSS REFERENCE TO RELATED APPLICATION

This is a continuation-in-part of our copending application Ser. No. 772,373, filed Oct. 31, 1968 now Pat. No. 3,518,915.

BACKGROUND OF THE INVENTION

Elastomeric, vulcanizable copolymers of ethylene, propylene and a polyene are normally prepared in systems containing large quantities of diluents or solvents, as 10 to 1 of diluent to olefins being polymerized. A system essentially free of extraneous solvents and containing substantially monomers only is described in U.S. Pat. 3,370,052. There are many advantages to such a system as compared to systems containing large quantities of diluents or solvents, but we have found that in the copolymerization of ethylene, propylene and a polyene in this system wherein the propylene is present in amount to produce a copolymer containing less than 50 weight percent propylene, that excessive polymer build-up occurs during polymerization. Such polymer build-up, particularly in continuous systems, interferes with the polymerization reaction, results in poor polymerization control, irregular reaction rates, mechanical problems are encountered in pumping and cleaning the equipment, and uniform polymers are not obtained. The polymer build-up problem is particularly noticeable when a norbornene as ethylidene norbornene and/or aliphatic dienes as 1,4-hexadiene are copolymerized with ethylene and propylene to form vulcanizable elastomers. It was also observed that as the molecular weight of the copolymers, increases, and/or as the temperature of polymerization is decreased, the polymer build-up problem becomes aggravated and catalyst efficiency decreases.

SUMMARY OF THE INVENTION

In the polymerization of ethylene, propylene and a polyene with a reduced vanadium catalyst, polymer build-up during the reaction is substantially reduced when there is included in the polymerization reaction mixture from above 5 to about 75 volume percent of a solubilizing agent, for example, an aliphatic hydrocarbon containing 6 to 10 carbon atoms, said percent based on the total of said aliphatic hydrocarbon and propylene.

DETAILED DESCRIPTION

The monomers polymerized in accordance with this invention are ethylene, another α-olefin as propylene or butene-1 and a polyene; including for example, 1,4-hexadiene, ethylidene norbornene, dicyclopentadiene, methyl tetrahydroindene and the like. Many of the known polyenes, of which there are many, are copolymerized with ethylene to provide unsaturation in the resulting copolymer may be used. The polyenes normally are aliphatic and alicyclic polyenes containing 4 to 10 carbon atoms and at least two >C=C< groups. The copolymers normally have average molecular weights above 2,000 and preferably above 50,000.

Such copolymers normally contain 50 mol percent or more of ethylene and less than about 15% of polyene. Particularly useful are elastomeric interpolymers containing about 50 to less than 80 mol percent ethylene, at least 5 mol percent of propylene or butene-1, and the polyene in amount to provide in the interpolymer olefinic unsaturation represented by an iodine number of from about 2 to about 35. These polymers may contain from about 0.1 to 10% of 1,4-hexadiene, dicyclopentadiene, butadiene, the norbornenes, 1,4,9-decatriene, methyl heptadiene, cyclooctadiene, cyclodecadiene, 1,4-pentadiene and the like.

One component of the catalyst is a hydrocarbon soluble vanadium compound, including for example, vanadium tetrahalides, vanadium oxyhalides, vanadyl acetylacetonate and vanadyl haloacetylacetonates. Typical hydrocarbon soluble vanadium catalysts include vanadium tetrachloride, vanadium oxytrichloride, vanadium acetylacetonate, vanadyl acetylacetonate and the like.

The other catalyst component is an alkyl aluminum compound of the general formula $R_xAlX_y$ wherein R is an alkyl group containing 2 to 8 carbon atoms, X is halogen, $x$ is 1 to 3, $y$ is 0 to 2, and $x+y=3$. Typical compounds include triethyl aluminum, triisobutyl aluminum, diethylaluminum dichloride, ethyl aluminum sesquichloride; diisobutyl aluminum fluoride, ethyl aluminum difluoride and the like. One of the catalyst components must contain a halogen atom. The molar ratio of alkyl aluminum compound and hydrocarbon soluble vanadium compound will be between about 35 to 1 and 1 to 1 but the preferred molar ratio is between 30 to 1 and 2 to 1.

Modifiers may also be used as is well known to those skilled in the art including small amounts of hydrogen, diethyl zinc and the like.

A polymerization temperature in the range of about −80° C. to about 25° C. may be employed, but more normally a temperature range of −20° C. to about 10° C. is employed and except at very low temperatures the polymerizations are normally conducted under pressure.

The pressure at which the polymerization reactions are conducted normally range from about 25 to about 100 p.s.i.g., that is, about 2 to 7 atmospheres. At temperatures in the range of about −20 to about 10° C. pressures normally will be about 60 to 90 p.s.i.g.

At the conclusion of polymerization reaction, it is desired to destroy or deactivate the catalyst and this is efficiently done by contacting the polymerization mixture containing unreacted monomers and the active vanadium catalyst with an aliphatic alcohol or ketone.

The polymerization mixture to which the alcohol or ketone is to be added normally is removed from the reactor before adding the alcohol or ketone so as not to contaminate the reaction zone which may be a vessel or a line with the short-stop. The alcohol or ketone is normally added in the effluent line from the reactor, which line may be of sufficient length, shape, and size to provide hold-up time for reaction of the alcohol or ketone with the vanadium catalyst. Thereafter the polymer is washed with a hydrocarbon and/or caustic solution to remove the catalyst residue.

The agents that contribute to decreasing polymer build-up in this polymerization system are aliphatic hydrocarbons containing 6 to 10 carbon atoms, preferably 6 to 8, including for example, hexane, heptane, octane and the like. The amount of agents used is critical and is based for convenience on the amount of propylene employed in the system. There must be present more than 5 volume percent and less than about 75 volume percent of the total volume of propylene and aliphatic hydrocarbon. Excellent results have been obtained within the range of about 10 to about 65 volume percent. Lesser amounts, as 10 to 30 percent, are satisfactory with polymers containing less than 60 weight percent ethylene, and better results are obtained with up to 65 volume percent when the percent copolymerized ethylene is up to 75 weight percent.

The hydrocarbon is useful in decreasing polymer build-up in batch or continuous systems and in batch systems. While it is normally added with the other ingredients, it may be proportioned in. There may be some difference in the efficiency of hydrocarbons as hexane and octane so that exactly equivalent results may not be obtained with the same volume concentration, but suitable variation within the ranges set forth herein are readily made by those skilled in the art.

The use of the defined hydrocarbons has been described in suspension polymerization systems for EPDM elastomers in which there are normally no substantial amounts of extraneous diluents. There normally will be present small amounts of solvents used in adding the catalyst constituents and these, of course, may be hexane and the like, usually in amounts less than 5% based on the propylene in the reactor, and if a hydrocarbon is used for this purpose containing 6 to 10 carbon atoms, as defined herein for such use, the total amount of such hydrocarbons plus that added should be no more than about 75 volume percent of the total of propylene and aliphatic hydrocarbons present in the reaction mixture.

EXAMPLE I

To demonstrate the practice of the invention a continuous polymerization was conducted. 1909 grams of propylene, 445 grams of ethylene and 20.8 grams of 5-ethylidene norbornene-2 were charged per hour to the reactor along with catalyst components of 0.192 gram of vanadium tris-acetylacetonate dissolved in 65.2 grams of perchloroethylene and 0.629 gram of diethyl aluminum chloride dissolved in 26.9 grams of hexane; and 0.630 gram of diethyl zinc dissolved in 11.9 grams of hexane. The temperature of polymerization was held at −5° C. at a pressure of 71 p.s.i.g. The residence time was 1.3 hours. The total solids of the polymer slurry from the reactor varied from 0 to 4% during the first seven hours of the run and as the total solids on dispersion increased from about 6 to 8%, polymer build-up increased to such high levels that the agitator motor became very hot and the reaction had to be stopped after only 11 hours of polymerization. This example was repeated with heptane charged in continuously in an amount equivalent to 13 weight percent of the total of propylene and hexane. A polymer slurry was produced with a total solids content of 26.8% polymer and only a minimum of polymer build-up occurring on the walls of the reactor during the course of the polymerization. The dry polymer had a polymer composition of 50.4% ethylene, 46% propylene and 2.8% 5-ethylidene-2-norbornene. Samples of this copolymer, compounded, based on weight parts per 100 weight parts of polymer, with 75 FEF carbon black, 25 processing naphtha oil, 5 zinc oxide, 1 stearic acid, 1.5 sulfur, 1.5 mercaptobenzothiazole, 0.8 tetramethylthiuram disulfide, 0.8 dipentamethylenethiuram tetrasulfide, 1,5-octadecyl-3-(3,5-di-t-butyl-4-hydroxyphenyl)propionate and cured at 320° F. for 24 minutes have tensile strengths in the range of about 1800 to 2000 p.s.i. and Durometer A hardnesses of about 70.

EXAMPLE II

Another continuous polymerization was conducted in a 600 liter reactor with a liquid phase in the reactor of about 350 liters at a pressure of 6.7 atmospheres and a temperature of 12.1° C. for 15 hours. The weight ratio of propylene to ethylidene norbornene was maintained at 70, the diethylaluminum chloride/vanadium tris-acetylacetonate ratio at 14.7, the diethyl zinc/vanadium tris-acetylacetonate ratio at 1.76, the residence time was 90 minutes and the polymer concentration in the reactor was about 10 weight percent. There was also present in the liquid phase 62.5% heptane. The copolymer contained, by infrared analysis, 3.5 weight percent ethylidene norbornene and 27.9 weight percent propylene. At the end of the reaction there was no polymer build-up in the reactor and when the reactor was discharged it was clean.

EXAMPLE III 842 grams of propylene, 26.4 grams of dicyclopentadiene, and 148.5 grams of hexane were charged to a 2 liter stirred glass reactor at a temperature of −10° C. and a pressure of 64 p.s.i.g. for about 3 hours. Ethylene and hydrogen were added until values of 25 mol percent $C_2$ and 8 mol percent $H_2$, in the vapor phase were reached. Polymerization was initiated by adding a catalyst consisting of (I) vanadium(acetylacetonate)3 and (II) diethyl aluminum chloride to the reaction mixture. A total of 0.00212 gram of (I) and 0.0162 gram of (II) were added over the course of the reaction. 223 grams of polymer at a total solids of 17.0% and a dilute solution viscosity of 2.0 was produced, with essentially no polymer build-up in the reactor. In other batch runs with 33.3 and 45 volume percent of n-heptane, based on the volume total of n-heptane and propylene charged, there was zero weight percent polymer build-up in the reactor as compared to runs in the absence of n-heptane in which polymer build-up as high as 100 weight percent was observed. Improved results were also obtained with methyl tetrahydroindene and 1,4-hexadiene as third monomers with ethylene and propylene.

The ethylene-propylene-polyene copolymers prepared in accordance with this invention find particular utility in automobile tires and in white or light colored ozone resistant compositions and articles as is well known to those skilled in the art.

We claim:

1. In the suspension polymerization of ethylene, propylene or butene-1 and a polyene containing 4 to 10 carbon atoms and at least two >C=C< groups, with a reduced vanadium catalyst, the improvement which comprises conducting the polymerization in the presence of from greater than 10 to about 65 volume percent of straight chain aliphatic hydrocarbon solubilizing agent containing 6 to 10 carbon atoms, said volume percent being based on the total volume of propylene and hydrocarbon.

2. The method of claim 1 wherein amounts of ethylene, propylene and the polyene are present in amounts to provide in the copolymer more than 45 mol percent ethylene and from 1/10 to 10% polyene, the vanadium catalyst is a hydrocarbon soluble salt, there is present an alkyl aluminum compound of the formula $R_xAlX_y$ wherein R is an alkyl group containing from 2 to 8 carbon atoms, X is halogen, $x$ is 1 to 3, $y$ is 0 to 2, and the agent is a hydrocarbon containing 6 to 8 carbon atoms present in amount from about 10 to 60 volume percent.

3. The method of claim 2 wherein the polyene is selected from the group consisting of 1,4-hexadiene, dicyclopentadiene, the norbornenes, and 1,4,9-decatriene, the vanadium compound is an acetylacetonate, $y$ is 1 to 2 and the hydrocarbon is hexane or heptane.

4. The method of claim 3 wherein the polyene is ethylidene norbornene and the vanadium compound is an acetylacetonate, and $y$ is 1 to 2.

5. The method of claim 3 wherein the polyene is 1,4-hexadiene and the vanadium compound is an acetylacetonate, and $y$ is 1 to 2.

6. The method of claim 3 wherein the polyene is dicyclopentadiene, 1,4-hexadiene or ethylidene norbornene and the vanadium compound is a vanadium oxysalt.

References Cited

UNITED STATES PATENTS

| | | | |
|---|---|---|---|
| 3,506,627 | 4/1970 | Zaim | 260—80.7 |
| 3,518,237 | 6/1970 | Duck et al. | 260—80.78 |
| 3,527,739 | 9/1970 | Valuassori et al. | 260—80.78 |
| 3,531,446 | 9/1970 | Sommer et al. | 260—80.78 |

JOSEPH L. SCHOFER, Primary Examiner

R. A. GAITHER, Assistant Examiner

UNITED STATES PATENT OFFICE
CERTIFICATE OF CORRECTION

Patent No. 3,644,311     Dated February 22, 1972

Inventor(s) Bart A. Dilididdo and Bernard F. Cinadr

It is certified that error appears in the above-identified patent and that said Letters Patent are hereby corrected as shown below:

Column 1, lines 29 and 30, "now Pat. No. 3,518,915" should be deleted.

Signed and sealed this 10th day of December 1974.

(SEAL)
Attest:

McCOY M. GIBSON JR.
Attesting Officer

C. MARSHALL DANN
Commissioner of Patents